United States Patent
Joslyn

(10) Patent No.: US 7,371,199 B2
(45) Date of Patent: May 13, 2008

(54) ONE-WAY CLUTCHED DAMPER FOR AUTOMATIC BELT TENSIONER

(75) Inventor: Robert C. Joslyn, Christian County, MO (US)

(73) Assignee: Dayco Products, LLC, Miamisburg, OH (US)

( * ) Notice: Subject to any disclaimer, the term of this patent is extended or adjusted under 35 U.S.C. 154(b) by 620 days.

(21) Appl. No.: 10/939,839

(22) Filed: Sep. 13, 2004

(65) Prior Publication Data

US 2005/0059518 A1    Mar. 17, 2005

(51) Int. Cl.
*F16H 7/08* (2006.01)
*F16H 7/18* (2006.01)

(52) U.S. Cl. ..................................... 474/135
(58) Field of Classification Search ............... 474/101, 474/109, 112, 117, 133–136; 192/48.92, 192/81, 101, 41 S, 41 R, 26
See application file for complete search history.

(56) References Cited

U.S. PATENT DOCUMENTS

| | | | |
|---|---|---|---|
| 4,583,962 A | | 4/1986 | Bytzek et al. |
| 4,596,538 A | | 6/1986 | Henderson |
| 4,832,665 A | | 5/1989 | Kadota et al. |
| 5,015,217 A | * | 5/1991 | Henderson ................ 474/135 |
| 5,035,679 A | * | 7/1991 | Green et al. ............... 474/135 |
| 5,370,585 A | * | 12/1994 | Thomey et al. ............ 474/112 |
| 5,575,727 A | * | 11/1996 | Gardner et al. ............ 474/135 |
| 5,598,913 A | | 2/1997 | Monahan et al. |
| 5,803,850 A | * | 9/1998 | Hong et al. ............... 474/135 |
| 6,231,465 B1 | | 5/2001 | Quintus |
| 6,264,578 B1 | * | 7/2001 | Ayukawa ................... 474/135 |
| 6,375,588 B1 | | 4/2002 | Frankowski et al. |
| 6,422,962 B1 | | 7/2002 | Lehtovaara et al. |
| 6,582,332 B2 | * | 6/2003 | Serkh ........................ 474/135 |
| 6,592,482 B2 | * | 7/2003 | Serkh ........................ 474/135 |
| 7,186,196 B2 | * | 3/2007 | Quintus .................... 474/135 |

FOREIGN PATENT DOCUMENTS

| | | | |
|---|---|---|---|
| EP | 1 277 989 A2 | | 2/2003 |
| JP | 02089838 A | * | 3/1990 |
| JP | 02102956 A | * | 4/1990 |
| JP | 05272606 A | * | 10/1993 |

* cited by examiner

*Primary Examiner*—Marcus Charles
(74) *Attorney, Agent, or Firm*—Joseph V. Tassone; Thompson Hine, LLP

(57) ABSTRACT

A new asymmetrically damped tensioner is provided utilizing a one-way clutch connected to a tensioner arm through a frictional damper. The frictional damper is in frictional contact with the arm and the one-way clutch is coupled to the frictional damper for movement therewith. The tensioner arm is pivotable in a first direction to take up belt slack and a second direction. The clutch is pivotable in the first direction but not the second direction. Because the one-way clutch is operatively engaged with the arm through the frictional damper, the tensioner is able to respond to high belt tension once the frictional force between the arm and the damper is overcome.

8 Claims, 1 Drawing Sheet

ONE-WAY CLUTCHED DAMPER FOR AUTOMATIC BELT TENSIONER

TECHNICAL FIELD

The present invention relates generally to tensioners and more particularly to an asymmetrically damped tensioner utilizing a one-way clutch operatively engaged with the tensioner arm through a friction damper.

BACKGROUND

It is common for a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occur as a result of manufacturing variation, operating temperature and component break-in or wear can also cause the tensioner to be unresponsive.

Timing belt systems have benefited from the use of asymmetric damping to address this problem. An asymmetrically damped tensioner provides damping when additional belt tension is encountered but is free to respond to slack belt conditions. Although asymmetric functionality may not be required for all other front end accessory drive tensioners, the potential for increased service life, solving other transient dynamic system problems including belt slip during a 1-2 gear shift, or simply making the tensioner less sensitive to damping variation make it a desirable design option.

One current solution to this problem uses a viscous linear damper mechanism, such as a shock absorber, attached to a pivoting arm. Asymmetric damping is achieved through, for example, check valves and different orifice sizes in the shock absorber. This solution, however, tends to be expensive and requires more packaging space than a conventional tensioner. Other solutions use wedges that increase damper friction during wind-up or spring loaded self-energizing brake shoe elements. These designs, however, tend to complex with many small parts to assemble.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other timing belt tensioner proposals including, for example, U.S. Pat. Nos. 4,832,665 and 6,375,588, use a one-way device coupled to a viscous damper. Although these devices offer good functionality, retention of the viscous fluid throughout the service life can be difficult. Yet another design disclosed in U.S. Patent App. Publication 2003/0008739 uses friction generated by the clamping action of a wrap spring clutch to provide damping.

The aforementioned tensioner designs are not ideal. Accordingly, a new tensioner design is desired.

SUMMARY

According to a first aspect, a tensioner is provided having an arm and a one-way clutched frictional damper. The arm is pivotable in a first direction and a second direction and the clutched damper is in frictional contact with the arm such that pivoting movement of the arm will urge the clutched damper to move with the arm. The clutched damper is free to pivot in the first direction but is restricted from pivoting in the second direction such that the damper will pivot with the arm in the first direction but will produce frictional damping when the arm pivots in the second direction relative to the damper.

According to a second aspect, a tensioner is provided including an arm, a frictional damper in frictional contact with the arm, and a one-way clutch coupled to the damper. The arm is pivotable in a first direction and a second direction. The clutch, however, is pivotable in the first direction but not the second direction.

According to a third aspect, a tensioner is provided that is operable in a first condition and a second condition, the tensioner having a pivotable arm, a frictional damper in frictional contact with the arm, and a one-way clutch coupled to the damper and pivotable in a first direction but not in a second direction. The first operating condition of the tensioner according to this aspect is characterized by the arm and the damper pivoting together in the first direction. This may occur as a result of friction between the arm and damper and as permitted by the one-way clutch. The second operating condition is characterized by the arm pivoting relative to the damper in a second direction. Relative motion between the arm and damper in this condition creates frictional damping. In a third possible operating condition movement by the arm in a second direction is halted as a result of friction between the damper and the arm.

DETAILED DESCRIPTION

Figure 1:
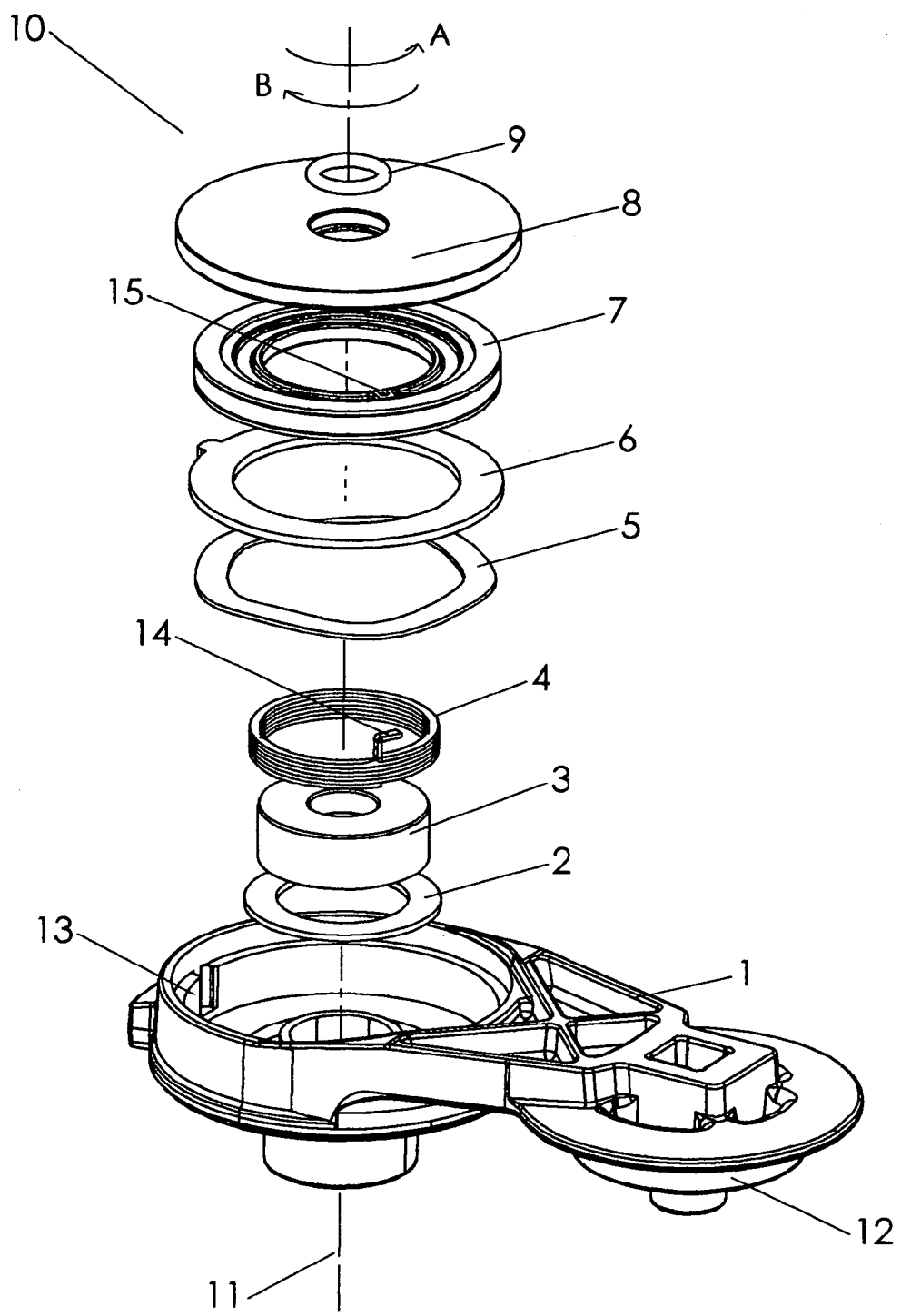
FIG. 1 is an exploded view of a new tensioner according to one embodiment.

The new tensioner disclosed herein uses a one-way clutch to activate a frictional damper only during wind-up (i.e. untensioning). Wind-up results when increasing belt tension causes the belt to lift the tensioner arm in a direction away from the belt. The present invention resists wind-up with a frictional damping force but does not resist movement of the tensioner arm toward the belt with the same frictional damping force. This characteristic is generally known as asymmetric damping.

The new tensioner herein achieves asymmetric damping in part by connecting the one-way clutch to the tensioner arm through the friction damper. In other words, the one-way clutch operates on the friction damper directly and on the tensioner arm only indirectly through the friction device. One advantage of this design is that the tensioner will also respond to high belt tension once the frictional force of the damper is overcome, i.e., the tensioner will not restrict all motion in the wind-up direction regardless of the belt tension. Additionally, in contrast to other ratcheting tensioners, the new tensioner is able to creep back to lower tension levels as a result of system vibration.

Referring now to the embodiment depicted in FIG. 1, the tensioner 10 includes an arm 1 and a one-way clutched frictional damper that is in frictional contact with the arm 1.

The one-way clutched frictional damper may be comprised of a frictional damper described below coupled to a one-way clutch.

The arm 1 is pivotable in a first direction A and a second direction B about a pivot axis 11. As is known in the art the arm 1 may be biased by, for example, a torsional spring (not shown) in, for example, the first direction A, to tension an associated power transmitting belt or chain. A pulley (not shown), which is rotatably attached to a distal end 12 of the arm 1, is thereby brought into engagement with the belt with a force to tension the belt.

In the embodiment that is depicted, the arm 1 further comprises a stator plate 6 and a wave spring 5. The stator plate 6 is coupled to a proximal portion 13 of the arm 1 for pivotal or rotational movement therewith, but is free to move axially with respect to the proximal portion 13 of the arm 1. The wave spring 5 is interposed between the stator plate 6 and the proximal portion 13 of the arm 1 to bias the stator plate 6 so as to provide a normal force.

The tensioner 10 further includes a frictional damper 7 that is in frictional contact with the arm 1. Specifically, the frictional damper 7 of FIG. 1 is in direct contact with the stator plate 6 portion of the arm 1. As a result of normal force generated by compression of the wave spring 5, a frictional force is created between the arm 1 and frictional damper 7. In the embodiment that is depicted, the frictional damper 7 is an annular disc having a high friction surface facing the stator plate 6. Of course, other frictional dampers could be utilized including, for example, a brake shoe design. The frictional damper may be made of any suitable material typically used in the art.

A one-way clutch is operatively engaged with the frictional damper 7 so as to restrict the movement of the damper 7. Referring still to FIG. 1, the one-way clutch may be a wrap spring 4 that is coupled to the frictional damper 7 for movement therewith. Specifically, the wrap spring 4 may be attached to the frictional damper through a bend or tab 14 at one end of the spring that fits within a slot or hole 15 on the damper 7. The remaining portion of the spring may be coiled around a clutch hub 3, which is non-pivotably mounted about the pivot axis 11. A bushing 2 may be interposed between the arm 1 and the clutch hub 3 to prevent direct contact between the pivoting and non-pivoting element.

The wrap spring 4 need not be rigidly attached to the clutch hub 3 to function. Instead the coil diameter of the spring is sized so as to fit snuggly around the clutch hub 3. In this manner, when the spring 4 is urged in one direction it will tighten onto the hub 3 and prevent relative motion between the spring 4 and the hub 3. When the spring is urged in the other direction the spring 4 will unwrap such that slip occurs between the spring 4 and the hub 3. Accordingly, the one-way clutch is pivotable in one direction but not in the opposite direction.

In accordance with the stated function of the invention, the one-way clutch should be oriented such that it is pivotable in the direction in which the arm 1 is moving to take up slack or tension a belt and should not be pivotable in the direction in which the arm 1 is lifted by the belt. Of course, any conventional one-way device including ratchets, ramp and rollers, sprague elements or spring clutches can be used to achieve the desired one-way clutch action.

Referring again to FIG. 1 an end cap 8 may be fixed relative to the arm 1 and may provide another surface for friction against the damper 7. In this embodiment the damper 7 is compressed between the stator plate 6 and the end cap 8 by force provided by the wave spring 5. An o-ring 9 may also be provided between the end cap 8 and the pivot axis 11 to protect the tensioner elements from contaminates that could reduce functionality or durability.

As is evident from the above description and FIG. 1, the new tensioner is operable in at least two conditions. In a first condition, the arm 1 and the damper 7 are free to pivot together in a first direction to take up slack in an associated belt. Specifically, pivoting movement of the arm 1 in response to, for example, a torsional spring, will be transferred through the frictional damper 7 to the one-way clutch as a result of frictional engagement of the damper 7 with the arm 1. Movement of the damper in this first direction will cause the wrap spring 4 to "unwrap" and thereby slip with little or no resistance on the clutch hub 3. In this manner, the arm 1, frictional damper 7, and wrap spring 4 are able to move in unison in the first direction with little or no damping while the arm 1 and damper 7 remain frictionally engaged with no relative motion therebetween.

In a second condition, the arm 1 pivots relative to the frictional damper 7 in a second direction thereby generating frictional damping force. Specifically, pivoting movement of the arm 1 in response to, for example, increasing tension in the belt, will be transferred through the frictional damper to the one-way clutch as a result of frictional contact between the damper 7 and the arm 1. A force urging the damper 7 to pivot or rotate in the second direction will cause the spring 4 to wrap more tightly onto the clutch hub 3 and thereby eliminate relative motion between the spring 4 and the hub 3. Motion of the damper 7 is likewise eliminated as a result of its coupling to the spring 4. In this manner, relative motion between the arm 1 and the frictional damper 7 is possible, in which case a frictional force is generated to resist movement of the arm 1 in the second direction.

If the force urging the arm 1 to pivot in the second direction is not great enough to overcome the frictional forces between the arm 1 and the frictional damper 7, a third condition may result in which the arm 1 and frictional damper 7 remain stationary together.

What is claimed is:

1. A tensioner comprising:
   an arm pivotable about a pivot axis;
   a stator plate coupled to the arm so as to be pivotable with the arm;
   a friction damper pivotable about the pivot axis, the friction damper in frictional contact with the stator plate;
   a wave spring interposed between the stator plate and the arm so as to bias the stator plate into frictional contact with the friction damper; and
   a one-way clutch coupled to the friction damper such that the friction damper is pivotable about the pivot axis in a first direction but not the opposite direction.

2. A tensioner as claimed in claim 1, wherein the one-way clutch comprises a clutch hub non-pivotably mounted to the pivot axis and a wrap spring coiled about the clutch hub.

3. A tensioner comprising:
   an arm pivotable in a first direction and a second direction about a pivot axis;
   a stator plate coupled to the arm so as to be pivotable with the arm about the pivot axis;
   a friction damper in frictional contact with the stator plate; and
   a one-way clutch coupled to the friction damper such that the friction damper is pivotable in the first direction about the pivot axis but not the second direction;

wherein the arm, the stator plate and the friction damper are pivotable together in the first direction as a result of frictional engagement between the stator plate and the friction damper; and wherein a friction force between the friction damper and the stator plate resists motion of the stator plate, if any, in the second direction relative to the friction damper.

4. A tensioner as claimed in claim 3, wherein the one-way clutch comprises a clutch hub non-pivotably mounted to the pivot axis and a wrap spring coiled about the clutch hub.

5. A tensioner comprising:

an arm pivotable in a first direction and a second direction about a pivot axis;

a one-way clutch comprising a clutch hub non-pivotably mounted about the pivot axis and a wrap spring coiled around the clutch hub such that the wrap spring is pivotable relative to the clutch hub about the pivot axis in the first direction but not in the second direction;

a friction damper coupled to the wrap spring of the one-way clutch so that the wrap spring and the friction damper are pivotable together about the pivot axis;

a stator plate coupled to the arm so as to be pivotable with the arm about the pivot axis; and a second spring interposed between the stator plate and the arm so as to bias the stator plate into frictional contact with the friction damper.

6. A tensioner as claimed in claim 5, wherein the arm, stator plate, the friction damper and the wrap spring of the one-way clutch are pivotable together about the pivot axis in the first direction at least in part as a result of frictional contact between the stator plate and the friction damper.

7. A tensioner as claimed in claim 5, wherein a frictional force between the friction damper and the stator plate will resist motion of the stator plate and the arm, if any, in the second direction.

8. A tensioner as claimed in claim 7, wherein the tensioner is operable to resist motion of the stator plate and the arm, if any, in the second direction, with a maximum force equal to the frictional force between the friction damper and the stator plate.

* * * * *